March 10, 1925.
S. L. HARWOOD
1,529,357
HEADLIGHT OPERATING MEANS FOR AUTOMOBILES
Filed Oct. 18, 1923
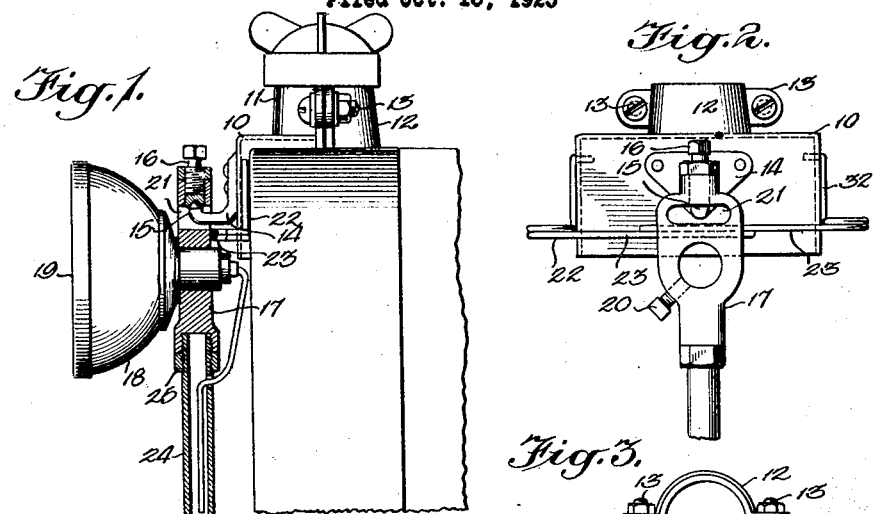
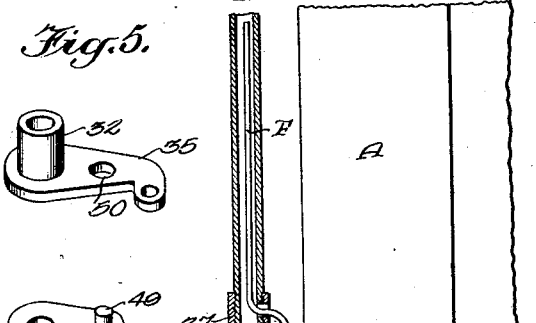
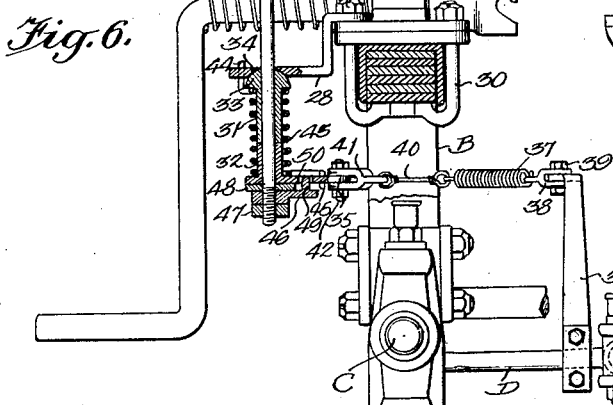
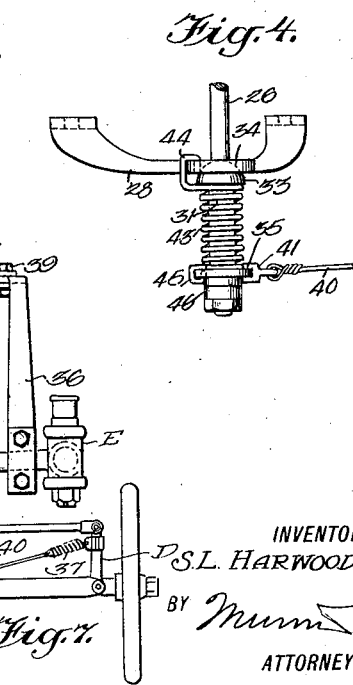
WITNESSES
INVENTOR
S. L. HARWOOD
BY
ATTORNEYS Patented Mar. 10, 1925.

1,529,357

UNITED STATES PATENT OFFICE.

SUMPTER LEA HARWOOD, OF UNIONTOWN, ALABAMA, ASSIGNOR OF ONE-HALF TO EDWARD R. WHITE, OF UNIONTOWN, ALABAMA.

HEADLIGHT-OPERATING MEANS FOR AUTOMOBILES.

Application filed October 18, 1923. Serial No. 669,380.

*To all whom it may concern:*

Be it known that I, SUMPTER L. HARWOOD, a citizen of the United States of America, and a resident of Uniontown, in the county of Perry and State of Alabama, have invented a new and Improved Headlight-Operating Means for Automobiles, of which the following is a description.

My invention relates to an auxiliary headlight for automobiles and arranged to operate from the movements of the steering means of an automobile for turning the light to the right or left with the operation of the steering means in turning the automobile.

The general object of my invention is to provide an auxiliary headlight of the indicated character improved in various particulars with respect to the means for suspending the same and to insure that the operating means practically responds to the steering gear with a view to coordinate the movements of the light turning devices with the steering means; to provide compensating means whereby the turning of the light will be promptly effected to direct the light laterally before the main lamps are completely turned with the turning of the vehicle and to provide a novel and effective means to prevent a vibration of the auxiliary light other than the vibration of the radiator or the rattling of any of the parts involved in the auxiliary light assemblage.

A more specific object is to produce the maximum strength in the light-turning standard and a stiffness therein greater than would be attained with a solid rod of the same weight.

The manner and means whereby the above and other objects are attained will clearly appear as the description proceeds.

Reference is to be had to the accompanying drawing forming part of this specification, it being understood that the drawing is merely illustrative of one example of the invention.

Figure 1 is a vertical section of an auxiliary headlight and its appurtenances constructed in accordance with my invention, the view showing the device applied to a radiator and other automobile parts;

Figure 2 is a front elevation of the upper portion of the auxiliary light assemblage;

Figure 3 is a plan view of the features shown in Figure 2;

Figure 4 is a front elevation of parts pertaining to the lower portion of the auxiliary light for supporting and operating the same;

Figures 5 and 6 are perspective views of the cranks or connecting arms;

Figure 7 is a plan view given to show the connection between the steering arm and the lamp standard.

In Figure 1 parts of an automobile are shown including a radiator A, a spring B, front axle C, steering arm D and tie rod E.

In carrying out my invention in accordance with the illustrated example an angle element 10 is provided formed with a clamp section 11 which with a mating clamp section 12 and bolts 13 serves to secure element 10 to the neck of the radiator. The angle shape of element 10 causes the horizontal upper member thereof to rest on the top of the radiator A while the front member bears against the face of the radiator above the tubes. On the element 10 at the front is a bracket 14 having an upturned conical bearing terminal 15 which enters the correspondingly recessed lower end of a screw 16 in a fitting 17 adapted to mount the reflector 18 of an auxiliary light 19, said fitting 17 having a set screw 20 for securing the reflector in position. The fitting 17 has a transverse slot 21 into which the bracket 14 extends, said slot affording clearance for the bracket and permitting the fitting to be swung to right or left. On the element 10 I provide springs 22 for a purpose hereinafter described, each of said springs being formed with a coil and terminating in overlapping free ends 23 at the back of the fitting 17 between the same and the element 10.

The fitting 17 is affixed to the upper end of a standard 24 by a threaded connection and lock nut 25. Said standard for its major portion is tubular to accommodate the conductor wires F and to produce stiffness greater than would be attained with a solid rod of the same weight.

The lower end of standard 24 has the form of a rod 26 of reduced diameter held to the tubular portion by a reducing nut 27. The lower end 26 of standard 24 passes in the present example of my invention through a bracket 28 of a form to be secured by nuts 29 to a clip or shackle 30 on the spring B on a certain make of cars, it being understood that the element 28 through which the standard extends will vary according to the make of car. Below the bracket 28 the end 26 of standard 24 extends through a bearing sleeve formed of an upper section 31 and a lower section 32. The upper end of the bearing sleeve section 31 has a rounded head 33 engaging a corresponding seat 34 at the under side of bracket 28 whereby the bearing sleeve will be self-centering. Rigid with the sleeve section 32 is a lateral arm 35 which is connected by suitable means with an element of the steering devices. In the illustrated example a standard 36 is clamped to the steering arm D of the tie rod E and a connection is established between the upper end of arm 36 and the arm 35. In the illustrated form a spring 37 is secured at one end by a clamp 38 and a bolt 39 to arm 36, said spring at its other end connecting by a wire 40 with a yoke 41 secured by a bolt 42 to the lateral arm 35. Thus, the movement of the steering arm D in one direction will carry the arm 36 through an arc and through the connection with the arm 35 will impart a turning movement to the sleeve section 32. About the sleeve sections 31, 32 is coiled a torsion spring 43, the upper end 44 of which is suitably anchored to the bracket 28 while the lower end 45 is anchored to the arm 35, and if unrestricted by the connecting wire 40, would cause rotation of the lamp 19 to extent of its turn in one direction. Hence, turning movement of the arm 35 in one direction by the connecting means would tighten the spring, while in the other direction the spring would accomplish the return, the further purpose of which spring will appear. A lateral arm 46 is formed upon or secured to the lower end 26 of lamp standard 24, said arm in the present instance being held to the standard member 26 by a lock nut 47, the arm 46 being spaced from the arm 35 by a thrust bearing or a washer 48. A stud 49 projects from one of the arms 35, 46 through the other arm. In the present example the stud 49 is on the arm 46 and projects upwardly through a hole 50 in the upper arm 35. The hole 50 is of such a size as to allow play between the walls of said hole and the pin 49 in order that vibrations set up in the steering devices will not be imparted to the arm 46 and to standard 24 and lamp 19.

The spring 43 by exerting a downward pressure on the arm 35 and an upward pressure against the head 33 maintains a firm contact between said head 33 and its seat 34 and at the same time exerts a downward force on the standard 24 whereby to firmly maintain the engagement between screw 16 and the bracket bearing point 15 tending to prevent vibrations. The springs 22 further contribute toward preventing the setting up of vibrations in the light 19 by maintaining a firm bearing of the fitting 17 against the back of the lamp and tends to hold the same in central position. The assemblage at the bottom of the rod section 26 including the spring 43 and the described connection between the arm 46 and the arm 35 constitute a compensating device to permit of the turning of the light 19 in advance of the complete turning of the car and permitting the continued movement of the steering gear after the light 19 has been turned.

It will thus be seen that movement of the lamp 19 in one direction is accomplished by the draw pull of the wire 40 from movement of the steering means, and that movement in the other direction is caused by unwinding of the combined torsion and compression spring 43 pulling against the wire 40, the arrangement permitting the use of a small connecting wire, while otherwise a much heavier and undesirable connecting means would have to be used. The hinged portions of the mechanism being held under spring tension (except in the instance of a very short turn of the car in one direction, which would have to be accomplished at slow speed) individual vibration of the operating parts is eliminated.

The broad surface afforded by the front of the angle element 10 serves to distribute over a wide area of the radiator above the tubes the pressure exerted by the lamp and its supporting means. Thus, the downward pressure exerted on the standard 24 by the spring 23 will be transferred to the bracket 14 and thus the major portion of said pressure will be distributed over a surface corresponding with that of the front of element 10. Also, it will be evident that the angle form of element 10 is well adapted to withstand and to distribute pressure from sudden shocks and jars which would be encountered in travelling over rough roads.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a headlight of the class described, a lamp supporting standard, an angle element having an upstanding bracket suspending said standard and having a horizontal member adapted to engage a portion of a radiator at the top surface thereof and said element having a vertical member adapted to engage the front of the radiator, said vertical member presenting a broad area for distributing pressure over a wide area of the radiator front.

2. In a headlight of the class described, an angle element, a clamp on said element adapted to engage a radiator neck, an upstanding bracket on the front of the angle element and offset therefrom, a lamp standard fitting on said standard and formed with a transverse slot into which said bracket extends, said fitting constituting a support for a lamp reflector, and a bearing member on the said fitting and resting on said bracket.

3. In a headlight of the class described, a lamp supporting standard, an element adapted to be secured to an automobile part below the radiator and forming a bearing seat, bearing sections sleeved on said standard one of said sections bearing against said element, a spring interposed between the sections tending to separate the same, an arm on the standard, a second arm on one of said sections, means to connect said second arm with the steering devices of an automobile, and a pin on one of said arms, the other of said arms having a hole into which said pin extends.

4. In a headlight of the class described, a lamp supporting standard, an element adapted to be secured to an automobile part below the radiator and forming a bearing seat, bearing sections sleeved on said standard one of said sections bearing against said element, a spring interposed between the sections tending to separate the same, an arm on the standard, a second arm on one of said sections having connection with a torsion spring tending to rotate the said arm in one direction, wire connecting means having spring means interposed to connect said second arm with the steering devices of an automobile, and means to cause the movement of said second arm to impart a turning movement to the arm on the standard.

SUMPTER LEA HARWOOD.